(12) United States Patent
Okajima et al.

(10) Patent No.: US 6,636,262 B1
(45) Date of Patent: Oct. 21, 2003

(54) AUTOMATIC FOCUSING DEVICE

(75) Inventors: Tadashi Okajima, Kashiwara (JP); Kazuhiro Tsujino, Matsubara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/308,617

(22) PCT Filed: May 15, 1998

(86) PCT No.: PCT/JP98/02153

§ 371 (c)(1),
(2), (4) Date: May 20, 1999

(87) PCT Pub. No.: WO98/52351

PCT Pub. Date: Nov. 19, 1998

(30) Foreign Application Priority Data

May 16, 1997 (JP) .............................................. 9-126564

(51) Int. Cl.$^7$ ......................... H04N 5/232; H04N 5/238
(52) U.S. Cl. ........................ 348/350; 345/354; 348/363; 348/364
(58) Field of Search ................................ 348/345, 347, 348/349, 350, 353, 354, 355, 362, 363, 364, 365, 222.1, 240.99; 250/208.1; 396/100

(56) References Cited

U.S. PATENT DOCUMENTS

| | | | | |
|---|---|---|---|---|
| 5,003,339 A | * | 3/1991 | Kikuchi et al. | 396/100 |
| 5,442,397 A | * | 8/1995 | Yoshimura et al. | 348/363 |
| 5,677,733 A | * | 10/1997 | Yoshimura et al. | 348/362 |
| 5,933,187 A | * | 8/1999 | Hirasawa et al. | 348/240.99 |
| 6,005,612 A | * | 12/1999 | Kikuchi et al. | 348/222.1 |

FOREIGN PATENT DOCUMENTS

| | | |
|---|---|---|
| EP | 0341692 A2 | 11/1989 |
| JP | 63-20972 | 1/1988 |
| JP | 1-157173 | 6/1989 |
| JP | 2-132977 | 5/1990 |
| JP | 3-32175 | 2/1991 |
| JP | 3-258171 | 11/1991 |
| JP | 4-329078 | 11/1992 |
| JP | 06-014236 | 1/1994 |

OTHER PUBLICATIONS

European Search Report dated Feb. 13, 2002.

* cited by examiner

*Primary Examiner*—Tuan Ho
(74) *Attorney, Agent, or Firm*—Armstrong, Westerman & Hattori, LLP

(57) ABSTRACT

Based on a video signal from a CCD (3), an exposure evaluation value producing circuit (8) produces an exposure evaluation value for automatic exposure, a focus evaluation value producing circuit (9) produces a focus evaluation value for autofocus, a prescribed value is set as a threshold value if the aperture area of an iris detected by a diaphragm amount detecting circuit (11) is equal to or higher than a prescribed value, and a threshold value is set according to the aperture area of the iris if the area is equal to or smaller than the prescribed value. If a luminance signal is larger than the reference value, integration of the high frequency component of a region having a luminance level equal to or higher than the threshold value is excluded.

6 Claims, 8 Drawing Sheets

AUTOMATIC FOCUSING DEVICE

TECHNICAL FIELD

The present invention relates to autofocus apparatuses and more particularly, to an autofocus apparatus for use in a video camera or the like.

BACKGROUND ART

In an autofocus apparatus used in a video camera or the like, the high frequency component of a luminance signal is used as a focusing evaluation value and a focus is supposed to be obtained when the evaluation value is largest. There is a system such as an iris for adjusting the brightness of the entire picture plane according to the brightness of the picture plane to avoid saturation of the brightness. If therefore the entire picture plane is bright, the luminance difference between a high luminance object present in the picture plane and the picture plane is not large, and therefore the brightness of the high luminance object is adjusted to avoid saturation, so that an out-of-focus, unclear image will not be saturated in the white direction, and the evaluation value in focus is largest.

According to conventional art, when the entire picture plane is bright, the brightness and evaluation value of the entire picture plane are adjusted to avoid saturation using an iris or the like and a focus is obtained in the presence of a high luminance object, but when the entire picture plane is dark, the iris is considerably opened if there is a partly high luminance object. This is because if the iris is stopped down for a partly high luminance object, the entire picture plane also becomes very dark and the resultant image would appear quite disagreeable when compared to the object actually observed by a person. Then, the high luminance part being greatly different from the entire picture plane in luminance is saturated in the direction of white, and therefore the saturated region will be large when it is out of focus, and the contour will be large, which increases the high frequency component and the evaluation value. In that state, the autofocus apparatus often stops operating as if a focus is obtained.

It is therefore a main object of the present invention to provide an autofocus apparatus which removes a high frequency component from the evaluation value of an image having a high luminance part, by excluding integration of the high frequency component in an area having a luminance level equal to or higher than a prescribed value when the entire picture plane is dark and the iris is considerably opened.

DISCLOSURE OF INVENTION

The present invention is directed to an autofocus apparatus to adjust an image input to an imaging device into focus by controlling a lens unit, and includes a focus evaluation value detecting circuit for integrating the high frequency component of a video signal for each of a plurality of regions formed by dividing a picture plane to output the result as a focus evaluation value, a focus control circuit for performing a focusing operation by displacing the relative position of the lens to the imaging device such that the focus evaluation value is maximized, a luminance level detecting circuit for detecting the luminance level of each region of the picture plane, an iris detecting circuit for detecting the aperture degree of an iris, an excluding circuit for selectively excluding integration of the high frequency component of a region by the focus evaluation value detecting circuit in response to the detected luminance level of the region being equal to or higher than a prescribe threshold level, and a control circuit for controlling the excluding circuit to exclude integration of a high frequency component in a region having a luminance level detected by the focus evaluation detecting circuit higher than a prescribed value when the detected iris degree indicates an aperture degree equal to or higher than a prescribed value.

Therefore, according to the present invention, in response to a detected iris degree indicating a value equal to or higher than a prescribed value, integration of the high frequency component of a region having a luminance level equal to or higher than a prescribed value is excluded, so that a focus can be promptly obtained in response to a high luminance part such as a spot light in a dark background where the iris is extremely stopped down, so the picture plane is very much dark but still appears agreeable.

More preferably, in response to the aperture degree of the iris, the threshold value of the luminance level to determine a region which is excluded from integration is changed.

According to a more preferable embodiment, if the detected aperture area of the iris is not less than a prescribed value, the prescribed value is used as the threshold value, and if the aperture area of the iris is not more than the prescribed value, the threshold value is set based on the aperture area of the iris.

BEST MODE FOR CARRYING OUT THE INVENTION

Figure 1:
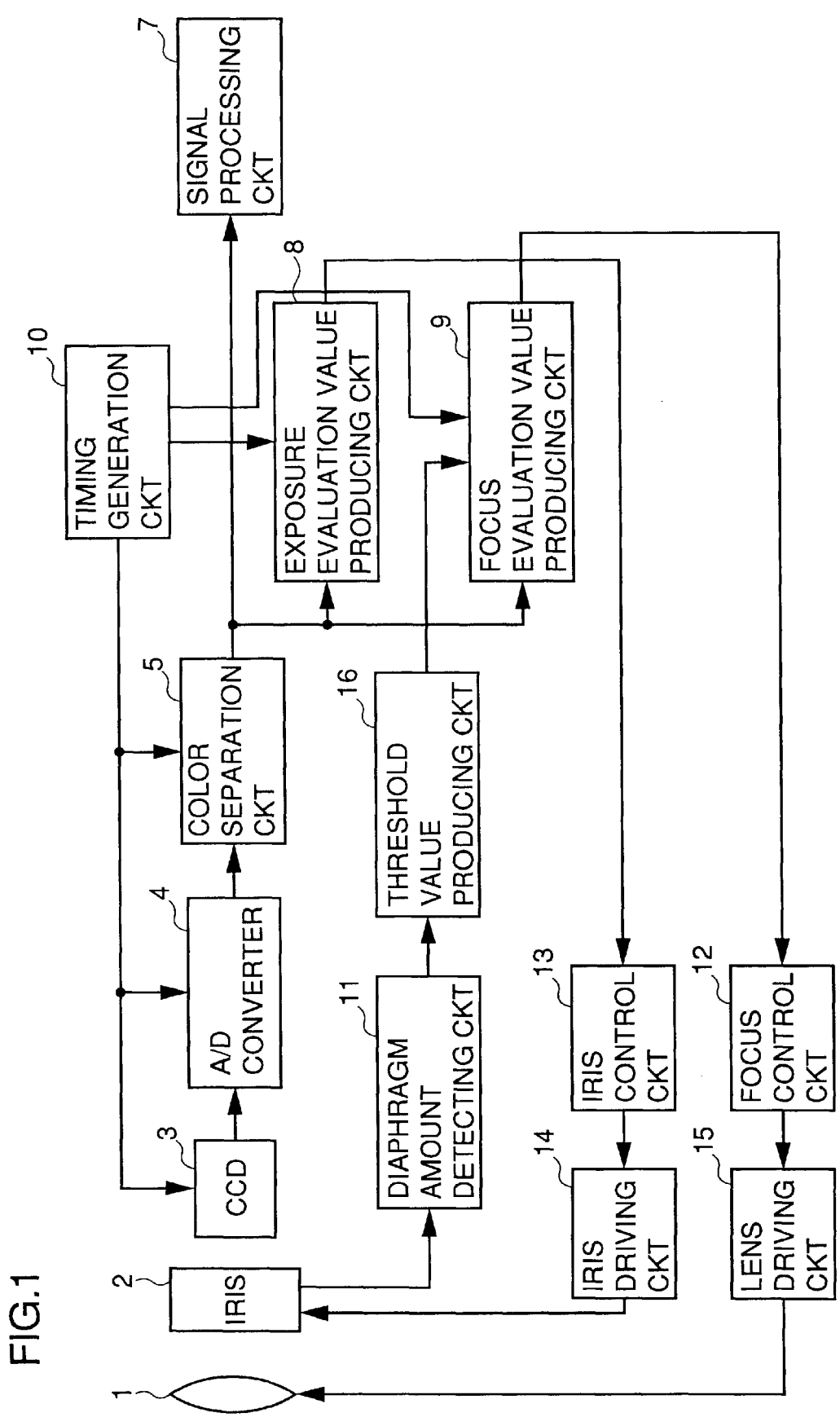
FIG. 1 is a block diagram of the general configuration of one embodiment of the present invention.

FIG. 1 is a block diagram of one embodiment of the present invention. In FIG. 1, a focus lens 1 is used to obtain a focus to a CCD 3 through an iris 2, and there is provided a zoom lens having a magnification-changing function on the object side of focus lens 1 though not shown. Focus lens 1 advances/withdraws in the direction of the optical axis by a lens driving portion 15 including a mechanism portion and a motor.

The object image formed at CCD 3 through the above-mentioned focus lens 1 is photoelectrically converted into a video signal, which is converted into a digital video signal by an A/D converter 4. The digital video signal is color-separated into R, G and B signals by a color separation circuit 5 for application to a signal processing circuit 7, an exposure evaluation value producing circuit 8 and a focus evaluation value producing circuit 9. The above-described CCD 3, A/D converter 4, color separation circuit 5, exposure evaluation value producing circuit 8 and focus evaluation value producing circuit 9 are provided with timing signals generated by a timing generation circuit 10. Signal processing circuit 7 adds a synchronizing signal to the video signal.

Iris 2 is used to adjust the quantity of light in the picture plane, and for example the aperture degree of iris 2 is detected by a diaphragm amount detecting circuit 11 using a Hall element. The detected output of diaphragm amount detecting circuit 11 is applied to a threshold value producing circuit 16, and a threshold value according to the aperture degree of iris 2 is produced and applied to focus evaluation value producing circuit 9. More specifically, threshold value producing circuit 16 sets a prescribed value as the threshold value if the aperture area of iris 2 is not less than the prescribed value, and sets a threshold value according to the aperture degree of iris 2 if the aperture area of iris 2 is not more than the prescribed value.

Figure 5:
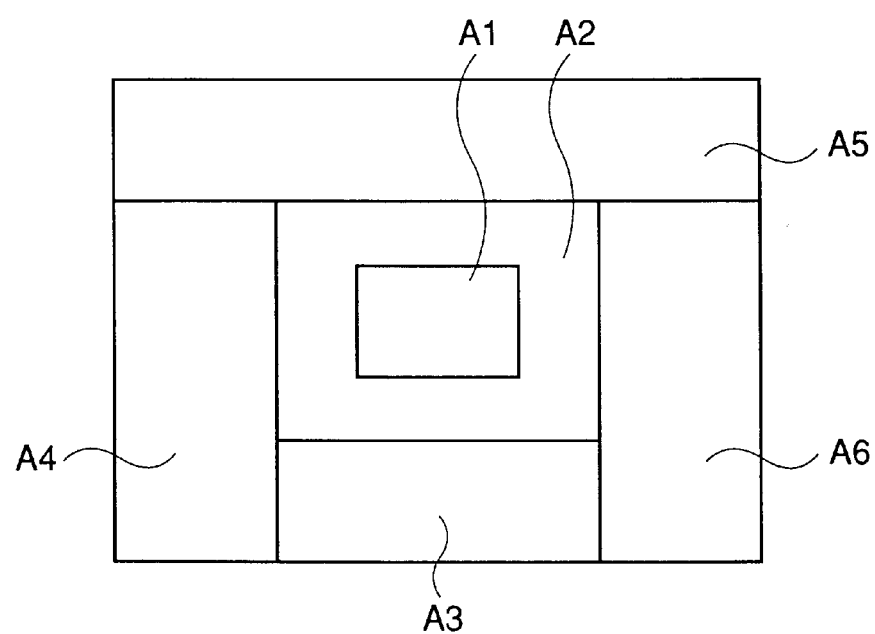
FIG. 5 is a view showing divisional areas (A1 to A6) for producing the exposure evaluation value of a picture plane.

For exposure evaluation value producing circuit 8, used is for example an automatic exposure adjusting device as disclosed by Japanese Patent Laying-Open No. 3-32175 as will be described in detail in connection with FIG. 2. More specifically, exposure evaluation value producing circuit 8 divides the picture plane into 6 regions A1 to A6 as shown in FIG. 5 and produces the luminance evaluation value of each region, produces the luminance level of the entire picture plane for correctly adjusting exposure, and the thus produced exposure evaluation values are applied to an iris control circuit 13. Iris control circuit 13 controls an iris driving portion 14 based on the applied exposure evaluation value, and iris driving portion 14 adjusts the aperture degree of iris 2.

Figure 4:
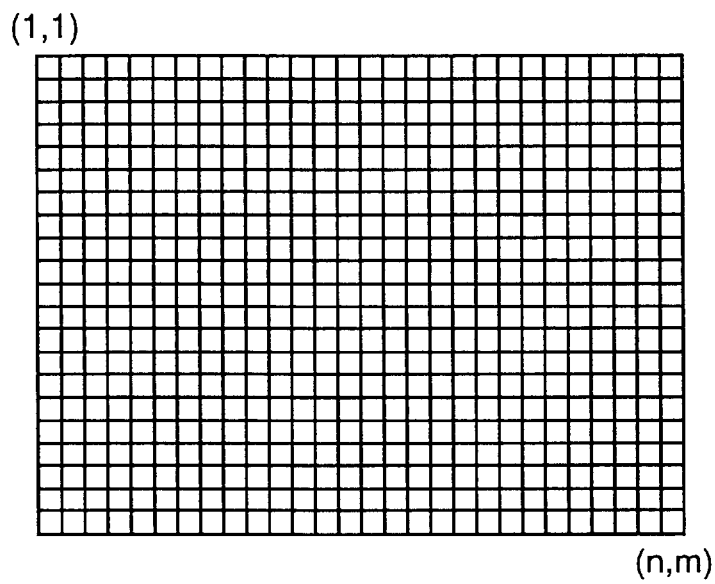
FIG. 4 is a view showing divisional areas (n, m) for producing a focus evaluation value.
Figure 6:
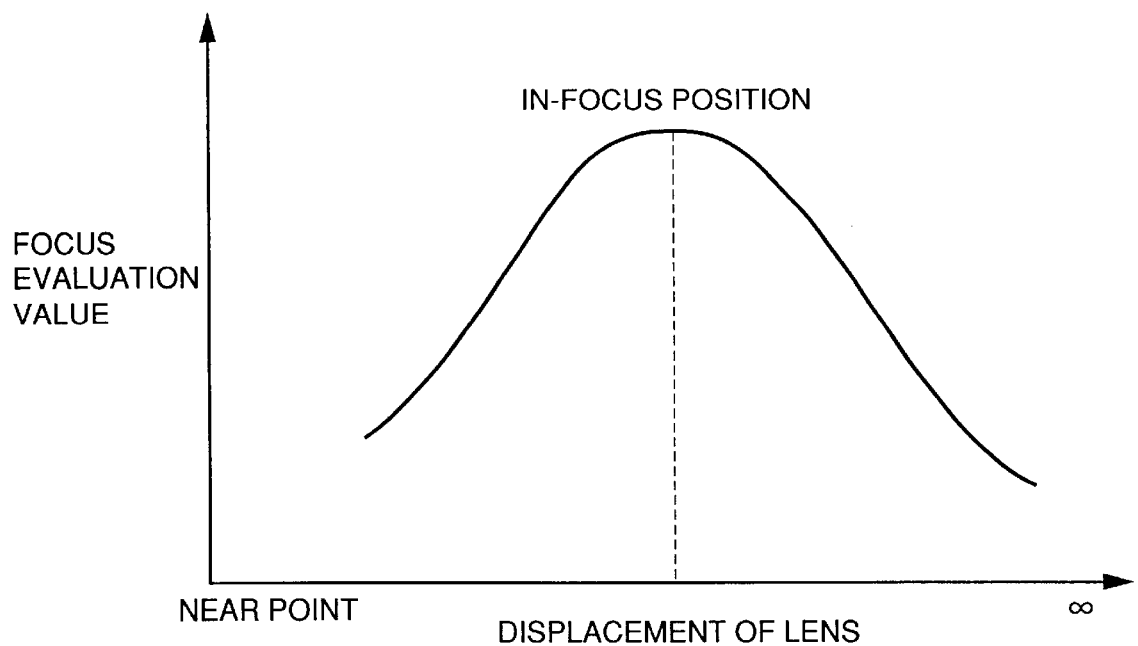
FIG. 6 is a graph showing the focus evaluation value and the displacement of a lens.

When focus evaluation value producing circuit 9 divides a picture plane into regions (1, 1) to (n, m) as shown in FIG. 4 based on RGB signals applied from color separation circuit 5, it integrates the high frequency component of a video signal for each region and produces a focus evaluation value, and the output signal is applied to a focus control circuit 12. Focus control circuit 12 displaces focus lens 1 from the near point to the infinite point and vice versa, and stops driving focus lens 1 as a focus is obtained when the focus evaluation value attains a maximum value as shown in FIG. 6. Regions (1, 1) to (n, m) can be segmented to the number of pixels in CCD 3 at most. A focusing operation is for example described in detail by Japanese Patent Laying-Open No. 3-258171.

If the detection of the aperture degree of iris 2 by diaphragm amount detecting circuit 11 indicating a level equal to or higher than a prescribed value, focus evaluation value producing circuit 9 excludes integration of a high frequency component having a luminance level equal to or higher than a prescribed level according to a threshold value received from threshold value producing circuit 16.

Figure 2:
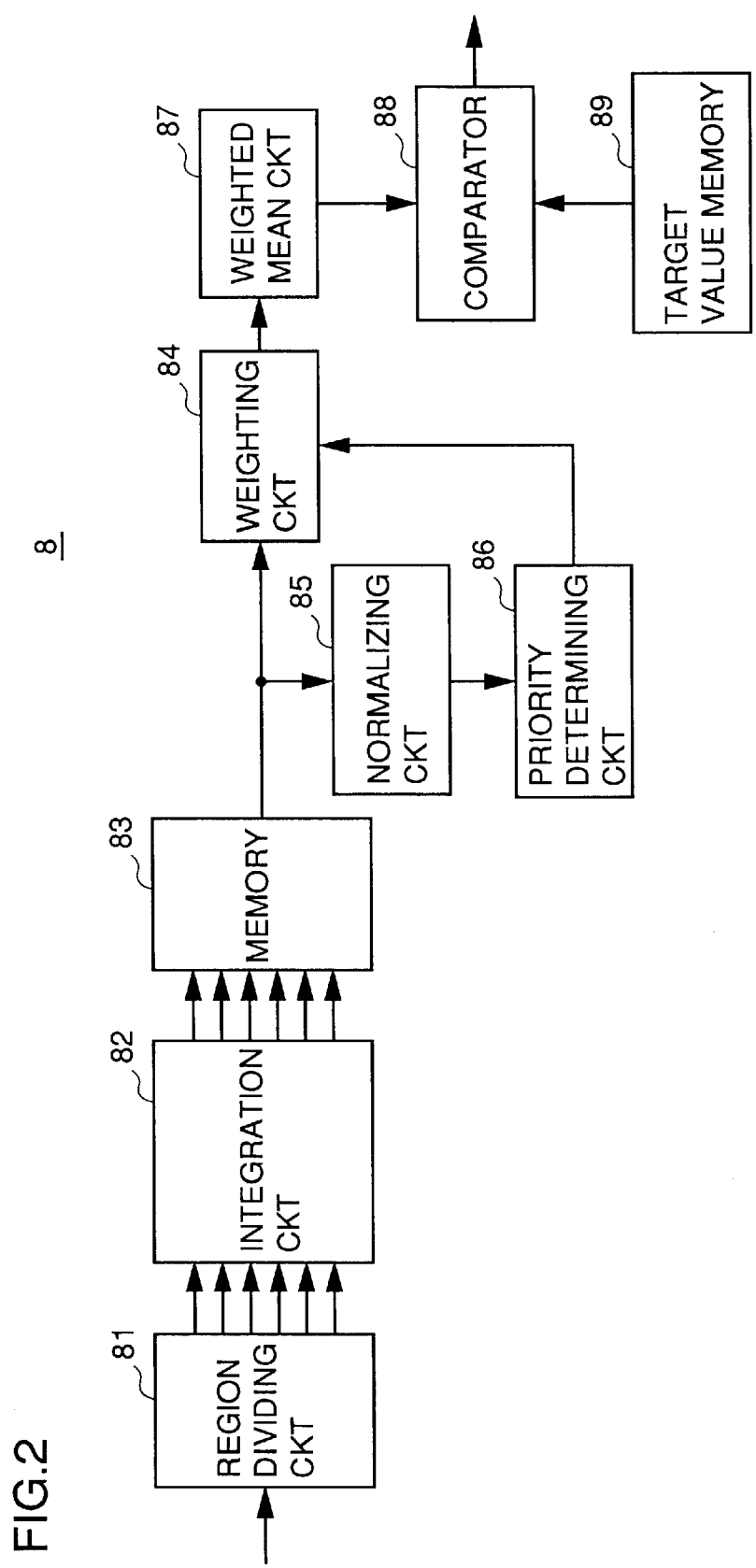
FIG. 2 is a detailed block diagram of an exposure evaluation value producing circuit shown in FIG. 1.

FIG. 2 is a detailed block diagram of the exposure evaluation value producing circuit shown in FIG. 1. In FIG. 2, a region dividing circuit 81 is provided with RGB signals from color separation circuit 5 shown in FIG. 1. Region dividing circuit 81 forms six regions A1 to A6 by dividing, and applies a region dividing signal to an integration circuit 82. Integration circuit 82 though not shown includes a digital integration circuit formed by an A/D converter, an adder to add the output of this A/D converter and the output of a succeeding latch circuit, and a latch circuit to latch the addition output. This integration circuit 82 causes a memory 83 to store an integration value for one field of a low frequency component of a luminance signal in each of regions A1 to A6. Memory 83 has its data updated for each field.

When integration for one field in one picture plane completes, the updated new integration value of one field in each region held in memory 83 is applied to a weighting circuit 84 and a normalizing circuit 85 as luminance evaluation values Y1 to Y6 for the respective regions. Normalizing circuit 85 divides the luminance evaluation values Y1 to Y6 of the regions by the areas of regions S1 to S6, respectively and outputs the resultant values per unit area of each region as normalized luminance evaluation values V1 to V6 (V1=Y1/S1, V2=Y2/S2 ...) to a priority determining circuit 86.

Priority determining circuit 86 determines the priority of each region based on each normalized luminance evaluation value. More specifically, priority determining circuit 86 compares for example the normalized luminance evaluation value of region A1 in the center of FIG. 5 and the normalized luminance evaluation value of region A2 in the periphery, and determines the priority of each region such that as these normalized luminance evaluation values come closer to each other, the priorities of regions A1 and A2 are larger than the priorities of peripheral regions A3 to A6. Weighting circuit 84 weights the priority of each region for priority processing. A weighted mean circuit 87 divides the added up value of the regions output from weighting circuit 84 by the sum of each priority and the area to produce a weighted average value, and the weighted average value is compared to a target value previously stored in a target memory 89 by a comparator 88 and an exposure evaluation value is output.

Figure 3:
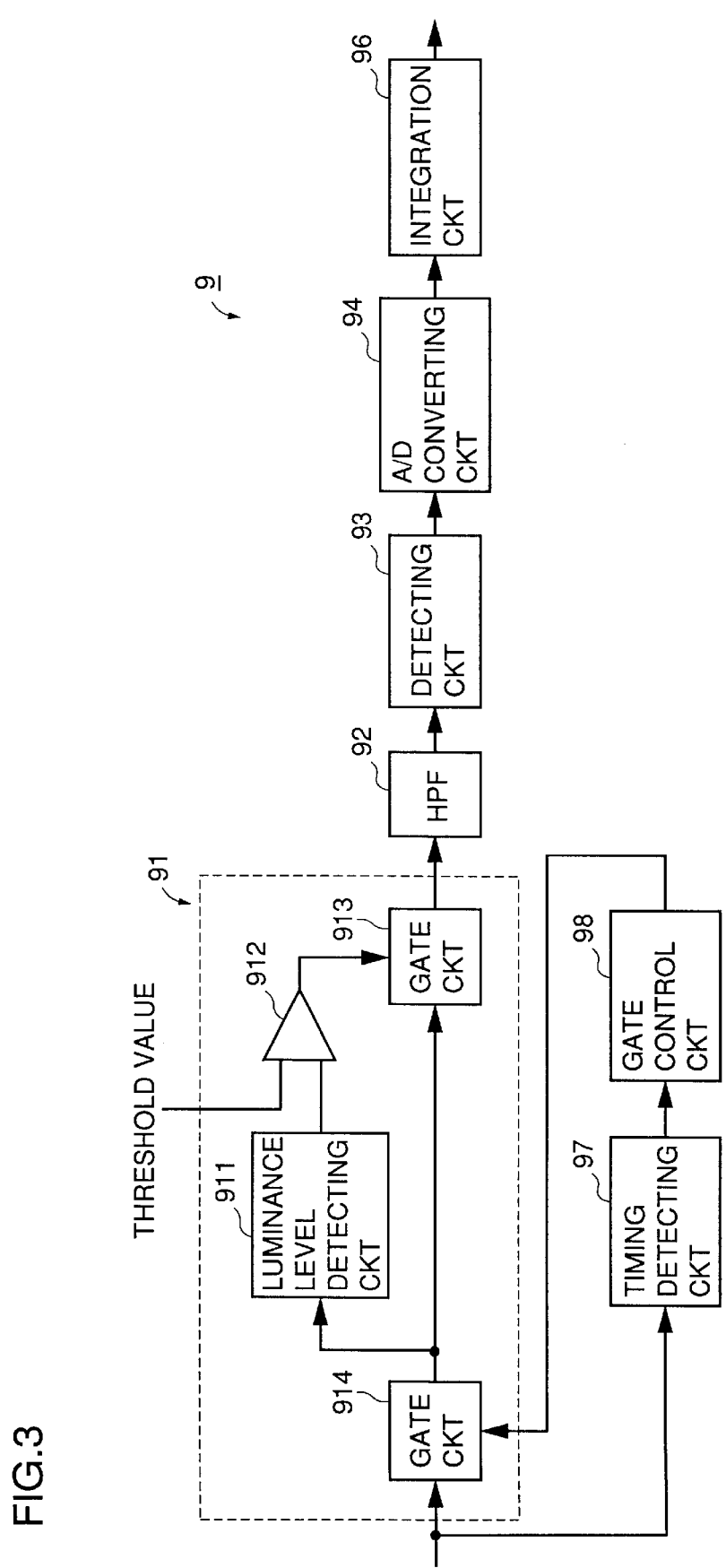
FIG. 3 is a detailed block diagram of a focus evaluation value producing circuit shown in FIG. 1.

FIG. 3 is a detailed block diagram of the focus evaluation value producing circuit shown in FIG. 1. In FIG. 3, a luminance signal component from RGB signals output from color separation circuit 5 shown in FIG. 1 is input to a high-luminance portion cut circuit 91. High-luminance portion cut circuit 91 is provided with a threshold value from threshold value producing circuit 16 in FIG. 1.

A timing detecting circuit 97 detects a timing signal from a video signal for application to a gate control circuit 98. Gate control circuit 98 produces a gate control signal to gate each divisional region (1, 1) to (n, m) shown in FIG. 4 for application to high-luminance portion cut circuit 91.

High-luminance portion cut circuit 91 includes a luminance level detecting circuit 911, a comparator 912, and gate circuits 913 and 914. Luminance level detecting circuit 911 detects the luminance level of each region of a picture plane from the luminance signal component applied through gate circuit 914 and applies the detected luminance level to comparator 912. Comparator 912 compares the luminance level of each region detected by luminance level detecting circuit 911 and the threshold value, allows the luminance signal to be output by opening gate circuit 913 if the luminance level is smaller than the threshold value, and prohibits the luminance signal from being output if the luminance level is larger than the threshold value, so that integration of the high frequency component of the region is selectively excluded.

Therefore, high luminance portion cut circuit 91 outputs the luminance signal component of a video signal output from color separation circuit 5 as it is to a high-pass filter (HPF) 92 for a normal blight scene where iris 2 is not fully open. High-pass filter 92 removes a low-band component of the video signal for application to a detecting circuit 93. Detecting circuit 93 detects a high frequency component of the luminance signal. The detection output is converted into a digital value by an A/D converting circuit 94 and applied to an integration circuit 96. Integration circuit 96 produces a focus evaluation value by integrating the applied luminance signal of each region. The thus formed focus evaluation value producing circuit 9 constantly outputs a focus evaluation value for 1 field.

Figure 7:
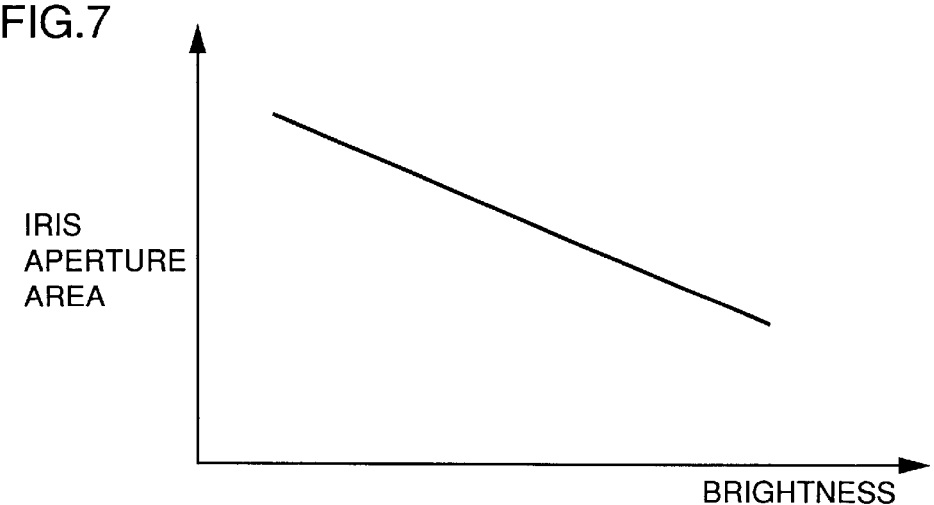
FIG. 7 is a graph showing the relation between the aperture area of an iris and the brightness.
Figure 8:
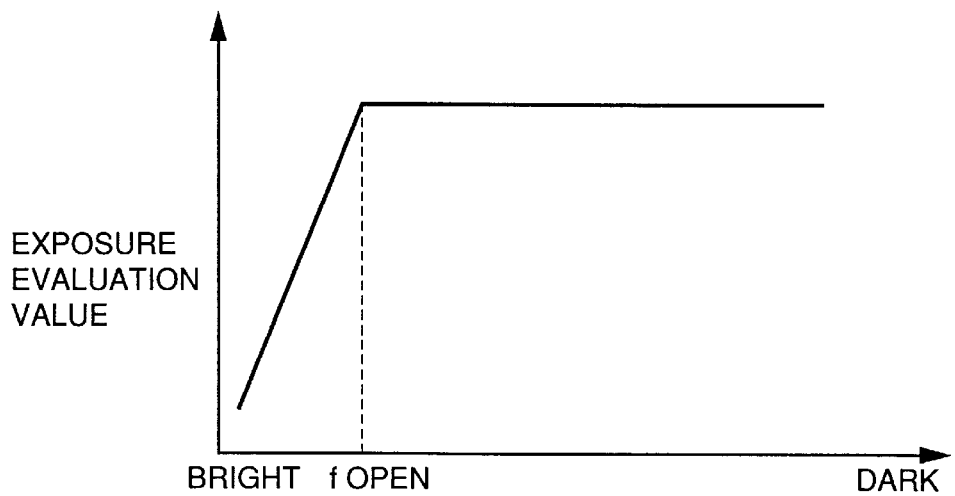
FIG. 8 is a graph showing the relation between a reference value and the aperture area of an iris.
Figure 9:
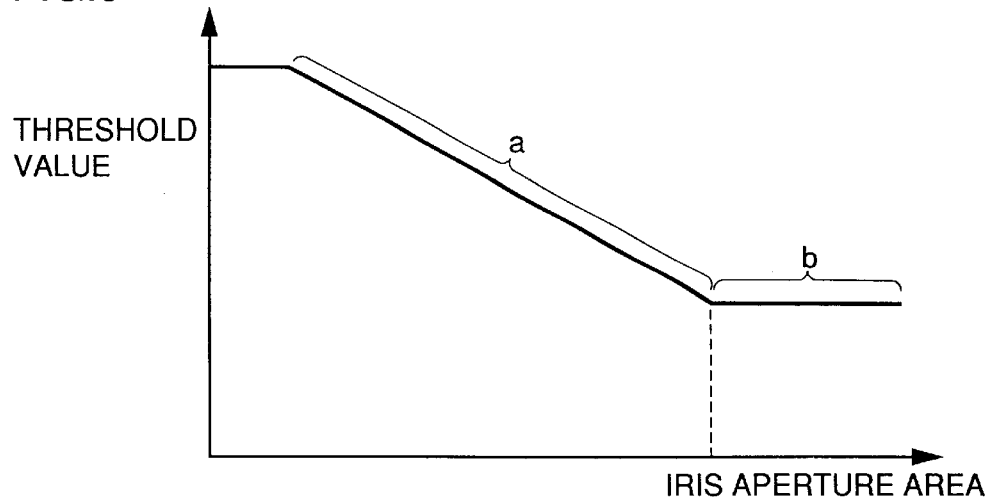
FIG. 9 is a graph showing the relation between the reference value and the aperture area of the iris.
Figure 10:
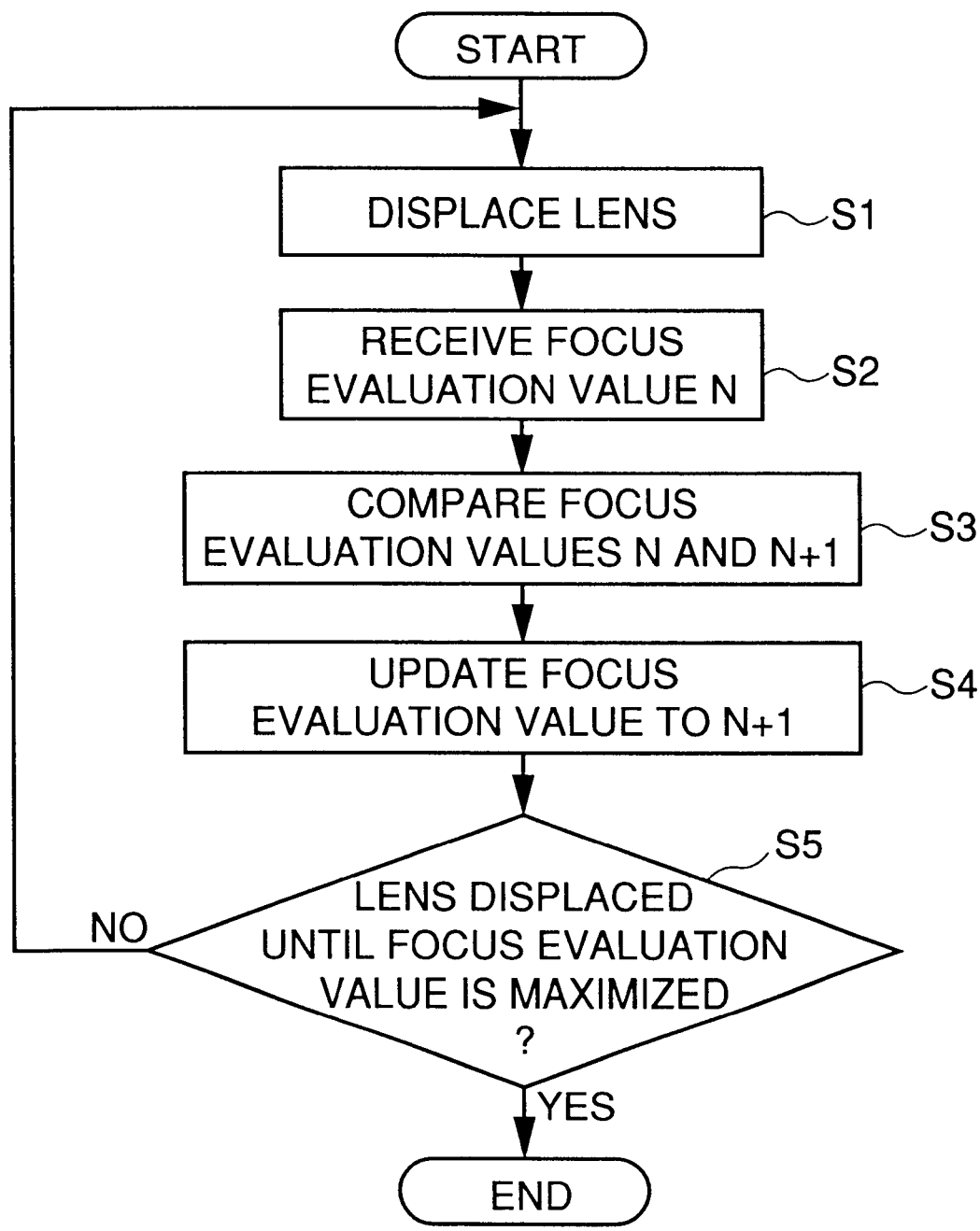
FIG. 10 is a flow chart for use in illustration of the specific operation of one embodiment according to the present invention.

FIG. 4 is a view showing how the picture plane is divided to produce a focus evaluation value, FIG. 5 is a view showing how the picture plane is divided to produce an exposure evaluation value, FIG. 6 is a graph showing the relation between the focus evaluation value and the displacement value of the lens, FIG. 7 is a graph showing the relation between the aperture area of an iris and the brightness, FIG. 8 shows the relation between the exposure evaluation value and the brightness, and FIG. 9 shows the relation between the threshold value and the aperture area of the iris. FIG. 10 is a flow chart for use in illustration of the operation of one embodiment of the present invention, and FIG. 11 is a flow chart for use in illustration of the operation of receiving the focus evaluation value shown in FIG. 10.

Operations of one embodiment of the present invention will be now specifically described. Focus evaluation value producing circuit 9 produces a focus evaluation value signal for application to focus control circuit 12 as described in conjunction with FIG. 3, and in step (herein after simply as "S") S1, focus control circuit 12 responds to the focus evaluation value signal to advance/withdraw focus lens 1 using lens driving portion 15. Then, in S2, focus control circuit 12 receives a focus evaluation value N for the next one picture plane.

Figure 11:
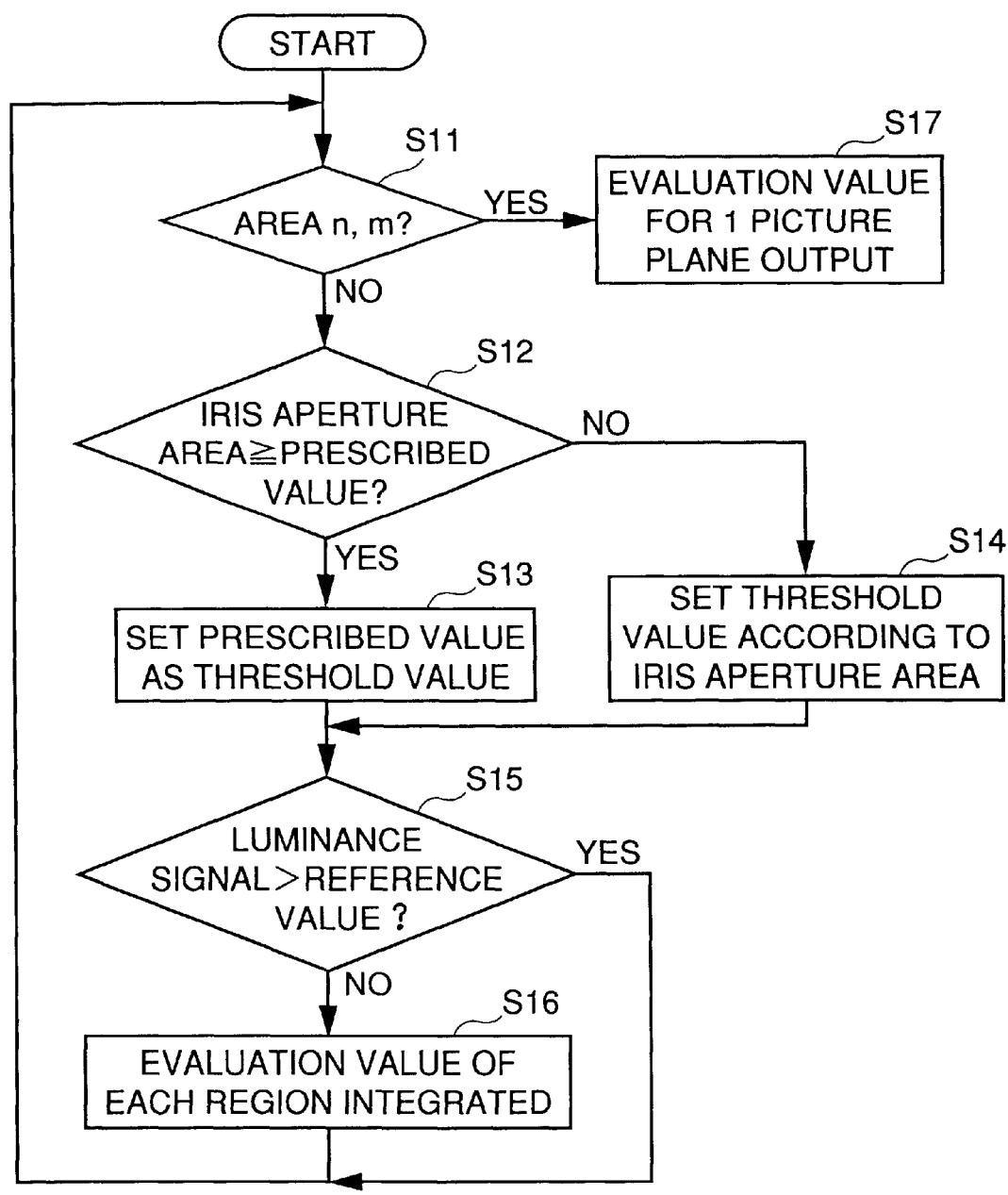
FIG. 11 is a flow chart for use in illustration of the operation of receiving a focus evaluation value shown in FIG. 10.

The reception of focus evaluation value N is processed according to the flow chat in FIG. 11. More specifically, in order to produce the evaluation values of regions starting from the first region (1, 1) of regions (1, 1) to (n, m) shown in FIG. 4 to the last region (n, m), it is determined in S11 whether or not the region is the last region (n, m), and if it is not the last region, threshold value producing circuit 16 determines in S12 if the aperture area of iris 2 detected by diaphragm amount detecting circuit 11 is not less than a prescribed value. If it is determined in S13 that the aperture area of iris 2 is not less than the prescribed value, the prescribed value is set as a threshold value. Then, it is determined in S15 whether or not the luminance signal is larger than a threshold value.

If the luminance signal is larger than the threshold value, high luminance portion cut circuit 91 prohibits the luminance signal from being output and impedes the luminance signal from being integrated by integration circuit 96. If the luminance signal is smaller than the threshold value, high-luminance portion cut circuit 91 outputs the signal without cutting the luminance signal. As a result, integration circuit 96 integrates the high frequency component of the region. The initial state shown in the flow chart in FIG. 11 is regained, and if the aperture area of iris 2 is not less than a prescribed value, threshold value producing circuit 16 sets the prescribed value as a threshold value, and if the aperture area of iris 2 is not more than the prescribed value in S14, the threshold value is set according to the aperture area of iris 2.

More specifically, as shown in FIG. 7, such a control is made that the brighter the object is, the smaller will be the aperture area. As shown in FIG. 8, however, if the brightness is not more than a prescribed value, in other words, if the picture plane is dark, iris 2 is fully open and the quantity of light input to CCD 3 is determined based only on the brightness of the lens. Therefore, according to the embodiment, as shown in FIG. 8, until iris 2 is opened, threshold value a shown in FIG. 9 is set, and in a dark picture plane after the iris is opened, the prescribed value b in FIG. 9 is set as a threshold value.

When the evaluation values of regions (1, 1) to (n, m) are integrated, the evaluation value for one picture plane is output. Then back to the flow chart in FIG. 10, the focus evaluation value output in S2 is received, focus evaluation value N previously received in S3 is compared to the present received focus evaluation value N+1, and if the present focus evaluation value N+1 is larger, the focus evaluation value is updated to N+1 in S4. It is determined in S5 if focus lens 1 is displaced until the focus evaluation value is maximized, if not maximized, the initial state is regained to displace focus lens 1, and the series of operations are repeated.

Focus control circuit 12 shown in FIG. 1 applies a driving signal to lens driving portion 15 in response to a focus evaluation value signal output from focus evaluation value producing circuit 9, and lens driving portion 15 drives focus lens 1.

When iris 2 is fully open in a dark picture plane, diaphragm detecting circuit 11 detects the state, and applies a detection signal to threshold value producing circuit 16 accordingly. Threshold value producing circuit 16 sets a threshold value for high luminance to be cut at high-luminance portion cut circuit 91 based on the detection output from diaphragm amount detecting circuit 11. Thus, high-luminance portion cut circuit 91 cuts the high-luminance component above the threshold value, and detecting circuit 93 detects only the high frequency component not more than the cut high luminance signal component. Therefore, if an object having a high-luminance part in a generally dark background enters into a picture plane, the high luminance component is removed as iris 2 is fully open, and the evaluation value will not increase when a focus is not obtained and the image is blurry, so that a focus can be obtained for such a high luminance object without difficulty. As a result, a high-luminance part in a dark background such as a spot light when a generally much dark picture plane appears agreeable, a focus can be obtained promptly without difficulty.

Industrial Applicability

As in the foregoing, an autofocus apparatus according to the present invention is suitable for use in a video camera adjusted using an iris or the like such that the brightness and evaluation value of the entire picture plane are not saturated when the entire picture plane is bright.

What is claimed is:

1. An autofocus apparatus controlling the position of a lens to obtain a focus for an image input to an imaging device through an iris comprising:

focus evaluation value detecting means for integrating a high frequency component of a video signal for each of a plurality of regions formed by dividing a picture plane to be imaged by said imaging device to output the result as a focus evaluation value;

a focus controller controlling the relative position of said lens to said imaging device to be changed, thereby obtaining a focus such that said focus evaluation value is maximized;

a luminance level detector detecting a luminance level of each of the regions of said picture plane;

an iris detector detecting the aperture degree of said iris;

a region excluding unit selevtively excluding integration of a high frequency component of a region by said focus evaluation value detector in response to the detected luminance level of the region being equal to or higher than a threshold value; and a region excluding controller controlling said region excluding unit to exclude integration of a high frequency component of the region whose detected luminance level is equal to or higher than said threshold value in response to the aperture degree of siad iris detected by said iris detector being at a level equal to or higher than a prescribed value.

2. The autofocus apparatus as recited in claim 1, wherein said region excluding controller changes said threshold value of the luminance level to determine said region to be excluded from integration in response to the aperture degree of the iris detected by said iris detector.

3. The autofocus apparatus as recited in claim 2, wherein said region excluding controller sets a constant value corresponding to said prescribed value as said threshold value if the aperture area of the iris detected by said iris detector is equal to or higher than said prescribed value and sets said threshold value according to the aperture area of said iris if the aperture area of said iris is equal to or smaller than said prescribed value.

4. An autofocus apparatus controlling the position of a lens to obtain a focus for an imaging input device through an iris comprising the steps of:

integrating a high frequency component of a video signal for each of a plurality of regions formed by dividing a picture plane to be imaged by said imaging device to output the result as a focus evaluation value;

controlling the relative position of said lens to said imaging device to be changed, thereby obtaining a focus such that said focus evaluation value is maximized;

detecting a luminance level of each of the regions of said picture plane;

detecting the aperture degree of said iris;

selectively excluding integration of a high frequency component of a region by said focus evaluation value output step in response to the detected luminance level of that region being equal to or higher than a threshold value; and controlling said region excluding step to exclude integration of a high frequency component of the region whose detected luminance level is equal to or higher than said threshold value in response to the aperture degree of said iris detected by said iris detecting step being at a level equal to or higher than a prescribed value.

5. The autofocus method as recited in claim 4, wherein said controlling step changes said threshold value of the luminance level to determine said region to be excluded from integration in response to the aperture degree of the iris detected by said iris detecting step.

6. The autofocus method as recited in claim 5, wherein said controlling step sets a constant value corresponding to said prescribed value as said threshold value if the aperture area of the iris detected by said iris detecting step is equal to or higher than said prescribed value and sets said threshold value according to the aperture area of said iris if the aperture area of said iris is equal to or smaller than said prescribed value.

* * * * *